July 28, 1931.  I. W. KNIGHT  1,816,016
FRANGIBLE LINK
Filed Feb. 1, 1929
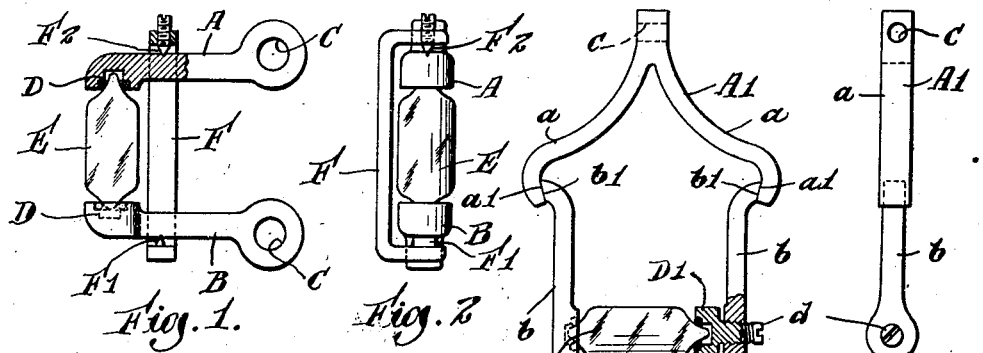
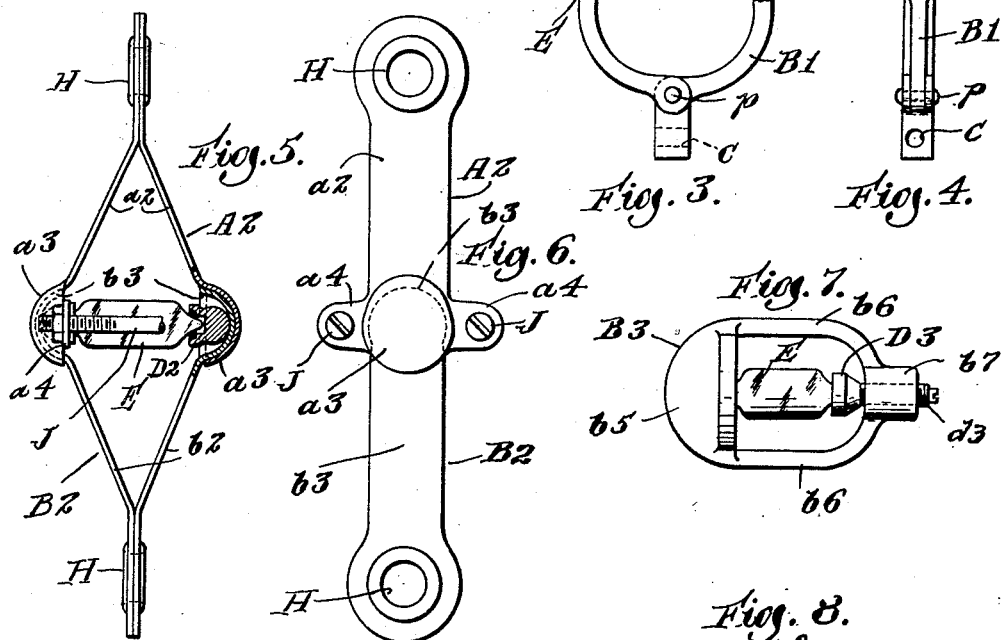
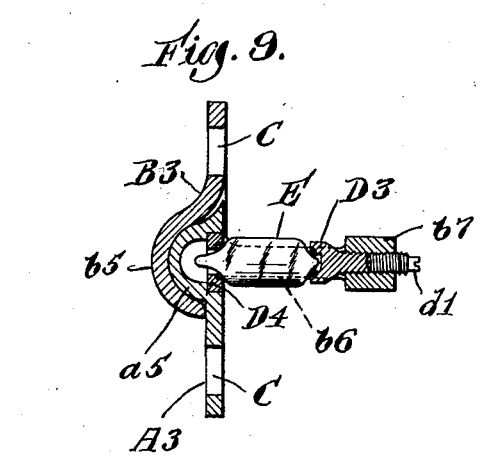
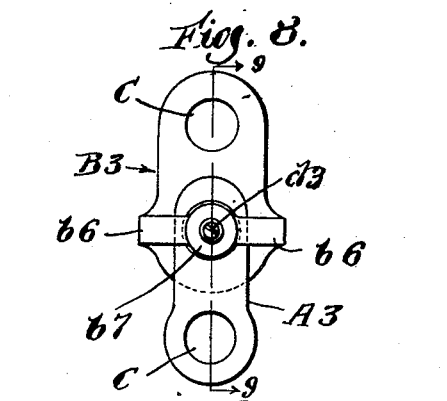
Inventor
Ira W. Knight,
by Harry Dexter Peck
Attorney Patented July 28, 1931

1,816,016

UNITED STATES PATENT OFFICE

IRA W. KNIGHT, OF PROVIDENCE, RHODE ISLAND, ASSIGNOR TO GENERAL FIRE EXTINGUISHER COMPANY, OF PROVIDENCE, RHODE ISLAND, A CORPORATION OF DELAWARE

FRANGIBLE LINK

Application filed February 1, 1929. Serial No. 336,864.

This invention relates to improvements in frangible links. More especially it has to do with improvements in links of the type disclosed in application No. 329,817, filed January 2, 1929 by Albert J. Loepsinger.

The link disclosed in that application has for its destructible element a frangible vessel with spherically-shaped ends joined by contracted neck portions to the body of the vessel. The separable members of the link engage the ends of the vessel and impose upon the latter a tensile stress. These peculiarly shaped vessels are somewhat difficult to make and it is an object of the present invention to provide a link in which a frangible vessel of plain simple shape may be used. Another object is to provide separable members which can be arranged with respect to each other and with the frangible vessel so that the force imposed on the latter will be one of compression rather than tension, albeit the separable members themselves are both pulled by the respective ties to which they are connected.

These objects are attained by providing separable members having parts which tend to move toward one another and by inserting between said parts a frangible vessel of simple bulb shape which, until destroyed, keeps the parts relatively stationary. Various embodiments are shown in the drawings each illustrative of how the principles of the invention may be applied, but the scope of the patent is not to be limited to these disclosures for it is intended to cover by suitable expression in the appended claims whatever features of patentable novelty exist in the invention as a whole.

In the accompanying drawings,

Figures 1 and 2 are elevations, taken at right angles to one another, of a link constructed in accordance with the present invention;

Figures 3 and 4 are similar views of a different modification;

Figures 5 and 6 show still another modification; and

Figures 7, 8 and 9 are a plan, side view and elevation in section on line 9—9 of Figure 8, respectively, of another modification.

Referring particularly to the drawings, the frangible link of Figures 1 and 2 has separable members A and B each having an eye C at one end for engagement with force exerting ties (not shown). Near the other ends of these members and on the side of each opposite to the tie are suitable seats D adapted to receive the drawn-out ends of a frangible vessel E.

This vessel is made preferably of quartz initially drawn in the form of a tube. It is then made into bulbs or vessels of the shape illustrated herein. The tube is fused at a zone near its end until the end can be drawn away to bring the walls of the heated zone together. The original end is then broken off and the new drawn-in end of the tube is further heated until it entirely closes and thus forms one end of a vessel. The tube is again heated a short distance from this end and again drawn out and broken off so that another closed end may be made. The part of the tube broken off becomes a vessel having the previously closed end and another similarly shaped end with a small opening through which the vessel is charged with a highly expansible fluid after which this open end is again fused and the opening closed. Upon being heated to a predetermined temperature the internal pressure exerted by the fluid will cause the vessel to be completely destroyed.

The above described charged vessel E is positioned with its ends resting on the seats D of the separable members A and B and a clamp F is slipped over these members a little beyond the vessel. Preferably this clamp has a fixed pointed, or knife-edge, jaw F1 which engages one member B and an adjustable jaw F2 for engagement with the other member A. By suitable adjustment of this latter jaw F2 the two jaws serve as fulcrums for the separable members, the eye ends of the latter being subjected to the pull of the ties and the other ends exerting a compressive force on the vessel. When the latter is destroyed upon its fluid charge being heated to a predetermined degree, the separable members will be pulled away from the clamp F and from each other thus freeing whatever has been held in restraint by the link.

In Figures 3 and 4 there is shown a separable member A1 formed as a rigid yoke with the inner surfaces a1 of its ends a converging downward. The other separable member B1 is similarly yoke-shaped but its arms b are pivoted at p and the other surfaces b1 of their ends are disposed so that when placed within the end a and spread apart, the surfaces b1 will engage the surfaces a1 and maintain the separable members together. Intermediate the pivot p and the surfaces b1 each arm of the separable member G has seats adapted to receive the ends of the frangible vessel E, one arm having a seat D1 on a threaded stem d to permit the insertion of the vessel and the subsequent spreading of the arms to make holding contact with the surfaces a1. Upon the shattering of the vessel the arms b collapse and the two members A1 and B1 separate.

Figures 5 and 6 disclose a link having separable members A2 and B2 adapted to be stamped from sheet metal. Each member comprises two arms, a2 and b2 respectively, joined together at one end by a grommet H. The opposite end a3, b3, of each arm is drawn cup-shaped, and outstanding beside the cups a3 of one pair of arms are ears a4. In assembling this link the cups b3 are placed within the cups a3 and the two pairs of cups are spread apart to receive the vessel E there being suitable seats D2 provided for this purpose. Bolts J are inserted through holes in the ears a4 and the cups and seats clamped against the ends of the vessel. Upon destruction of the latter, the pull on the arms a2, b2 being transmitted to the curved surfaces of the cups a3, b3, cause the latter to separate and thus free the separable members.

The link disclosed in Figures 7, 8 and 9 has a separable member A3 with an eye C at one end and an offset spherically shaped portion a5 at the other end. This portion is received in a spherical socket b5 of a separable member B3. Extending away from opposite sides of this socket b5 are the arms b6 of a yoke which terminates in the neck b7. This has a threaded bore to accommodate the stem d3 of a seat D3 for one end of the frangible vessel E. The vessel also rests on a seat D4 which in turn bottoms on a shoulder in the hollow of the offset portion a5. When the frangible vessel is destroyed by the action of its fluid contents, the portion a5 slips out of the socket b5 and the separable members are set free.

The advantages of this type of link are many. The frangible member is entirely free from the dangers of corrosion and by suitable selection of metal, the separable member can also be made substantially free from this danger. The characteristics of the frangible vessel are permanent. There is no "cold flow", and the link can be depended upon to give way at a predetermined temperature no matter how long it has been exposed to the elements. In the arrangement of parts disclosed in this application, the frangible vessel is subjected only to a compressive force which it is most capable of resisting. Because of this, links constructed in accordance with this invention are capable of supporting loads far beyond the limits permitted with the ordinary fusible links and even greater than the loads deemed safe when a frangible vessel is subjected to tensile forces. And where as in the disclosures of Figures 3–9, the greater part of the pull of the ties is actually carried by the separable members themselves and only a component of this pull is applied as a compressive force on the frangible vessel, the links can be relied upon with complete safety and without likelihood of premature failure even under most extreme loadings.

I claim:

1. A frangible link comprising, in combination, members adapted to be connected to ties and separably connected to each other, and a frangible vessel arranged to resist compressively the tendency of said members to separate; said vessel containing expansible fluid adapted upon being heated to a predetermined degree to destroy said vessel and thereby permit said members to separate.

2. A frangible link comprising, in combination, a member adapted to be connected to a tie; a second member adapted to be connected to a tie; and means holding said members from separating comprising an element under compression; and means for adjusting the compression on said element.

3. A frangible link comprising, in combination, a pair of separable members formed to make surface contact with one another and to be held together so long as said surface contact is maintained; means maintaining said contact comprising a frangible vessel arranged with respect to said members to resist the tendency of said surfaces to separate; said vessel being charged with expansible fluid adapted upon being heated to a predetermined temperature to destroy said vessel.

4. A frangible link comprising, in combination, a separable member adapted to be connected to a tie having a cup-shaped portion; a second separable member adapted to be connected to a tie having an offset portion adapted to be received in the cup-shaped portion of the first said member; means maintaining said offset portion within said cup-shaped portion thereby to prevent separation of the said members; said means comprising a charged frangible vessel adapted to give way at a predetermined temperature and thereby permit separation of said members.

5. A frangible link comprising, in combination, a member adapted to be connected to a tie having a socket and a yoke extending laterally away from said socket; a second member adapted to be connected to a tie having an offset portion adapted to be received in said socket; and means interposed between said offset portion and the yoke maintaining said portion within the socket and thereby preventing separation of said members; said means comprising a charged frangible vessel adapted to give way at a predetermined temperature and thereby permit said portion to be withdrawn from said socket.

Signed at Providence, Rhode Island, this 30th day of January, 1929.

IRA W. KNIGHT.